United States Patent
Agarwal et al.

(10) Patent No.: US 7,738,648 B1
(45) Date of Patent: Jun. 15, 2010

(54) METHODS, SYSTEMS AND COMPUTER PROGRAM PRODUCTS FOR REROUTING SPECIFIC SERVICES TRAFFIC FROM A SIGNALING MESSAGE ROUTING NODE

(75) Inventors: Devesh Agarwal, Raleigh, NC (US); Raghavendra G. Rao, Cary, NC (US)

(73) Assignee: Tekelec, Morrisville, NC (US)

( * ) Notice: Subject to any disclaimer, the term of this patent is extended or adjusted under 35 U.S.C. 154(b) by 1010 days.

(21) Appl. No.: 11/478,834

(22) Filed: Jun. 30, 2006

Related U.S. Application Data

(60) Provisional application No. 60/695,497, filed on Jun. 30, 2005.

(51) Int. Cl.
*H04M 7/00* (2006.01)
(52) U.S. Cl. .................. 379/221.1; 379/221.3
(58) Field of Classification Search ............ 379/221.01, 379/221.03, 221.1
See application file for complete search history.

(56) References Cited

U.S. PATENT DOCUMENTS

| | | | |
|---|---|---|---|
| 5,930,236 A * | 7/1999 | Havansi | ...................... 370/254 |
| 6,639,981 B1 | 10/2003 | Dunn, Jr. et al. | |
| 6,647,113 B2 | 11/2003 | McCann et al. | |
| 6,662,017 B2 | 12/2003 | McCann et al. | |
| 6,836,477 B1 | 12/2004 | West, Jr. et al. | |
| 7,065,200 B2 * | 6/2006 | Lim | ........................... 379/229 |
| 7,136,477 B2 * | 11/2006 | Craig et al. | ................. 379/230 |
| 2002/0054674 A1 | 5/2002 | Chang et al. | |
| 2004/0095889 A1 | 5/2004 | Chang et al. | |
| 2005/0113095 A1 | 5/2005 | Allison | |

\* cited by examiner

*Primary Examiner*—Creighton Smith
(74) *Attorney, Agent, or Firm*—Jenkins, Wilson, Taylor & Hunt, P.A.

(57) ABSTRACT

Methods, systems, and computer program products for rerouting signaling message traffic in response to unavailability of one or more services are disclosed. According to one method, service signaling message traffic is received at a signaling message routing node that provides a plurality of different services. It is determined whether at least one of the services is unavailable. In response to determining that at least one of the services is unavailable, the signaling message traffic for the unavailable service is rerouted to an alternate destination. Signaling message traffic for the remaining services is received and processed.

32 Claims, 4 Drawing Sheets

METHODS, SYSTEMS AND COMPUTER PROGRAM PRODUCTS FOR REROUTING SPECIFIC SERVICES TRAFFIC FROM A SIGNALING MESSAGE ROUTING NODE

RELATED APPLICATIONS

This application claims the benefit of U.S. Provisional Patent Application Ser. No. 60/695,497 filed Jun. 30, 2005; the disclosure of which is incorporated herein by reference in its entirety.

TECHNICAL FIELD

The subject matter described herein relates to routing signaling messages, providing services in response to received signaling messages, and for rerouting signaling messages in response to unavailability of one or more services. More particularly, the subject matter described herein includes methods, systems and computer program products for rerouting specific services traffic from a signaling message routing node.

BACKGROUND ART

In telecommunications networks, it may be desirable to provide services at an intermediate node between an originating node and a terminating node for some signaling messages. If the intermediate node is a signaling message routing node, one example of services that may be provided are services for global-title-routed signaling messages. Another type of services that may be provided includes triggerless services. Triggerless services, as used herein, are services where a signaling message is not normally terminated at the intermediate node, unless the intermediate node is responding on behalf of a terminating node. Examples of triggerless services that are not normally terminated at an intermediate node include global title translation service, flexible HLR and SMSC routing service, for example as described in commonly-assigned U.S. Pat. No. 6,836,477, mobile number portability service, for example, as described in commonly-assigned U.S. Pat. No. 6,662,017, triggerless number portability service, for example as described in commonly-assigned U.S. Pat. No. 6,639,981, universal triggerless number portability service, for example as described in commonly-assigned U.S. Pat. No. 6,647,113, triggerless mobile group dialing services, for example as described in commonly-assigned U.S. Patent Publication No. 2005/0113095, triggerless screening of call setup messages, for example, as described in commonly assigned U.S. Patent Application Publication No. 2002/0054674, and triggerless screening of wireless message service messages, for example as described in commonly-assigned U.S. Patent Publication No. 2004/0095889. The disclosures of each of the referenced patent publications are hereby expressly incorporated herein by reference in their entireties.

One problem associated with providing triggerless and other types of services at an intermediate node, such as a signal transfer point, occurs when multiple services are present on the intermediate node and one or more of the services becomes unavailable, while the remaining services are available. In conventional methods, when one triggerless service becomes unavailable, the intermediate node takes steps to reroute all traffic to an alternate destination by sending a message to any message originator, even though some of the services may be available. Rerouting all traffic from the intermediate node is undesirable because signaling message traffic destined for available services is also rerouted.

Accordingly, there exists a need for methods, systems, and computer program products for selectively rerouting signaling message traffic relating to a service in response to unavailability of the service.

SUMMARY

According to one aspect, a method for selectively rerouting signaling message traffic relating to a service in response to unavailability of the service is provided. The method may include receiving signaling message traffic at a signaling message routing node that provides a plurality of different services. The method may further include determining whether at least one of the services is unavailable. In response to determining that at least one of the services is unavailable, traffic from the unavailable service is routed to an alternate destination and traffic relating to any available services is continually processed by the node.

In one exemplary implementation, rerouting the traffic relating to the unavailable service may include receiving traffic indicated for a particular service at a signaling message routing node, detecting unavailability of the service, and rerouting the traffic from the signaling message routing node to an alternate destination. In another implementation, rerouting the traffic may include detecting unavailability of a service provided by a signaling message routing node, and informing an originating node to reroute traffic corresponding to the specific service type to alternate destination.

The subject matter described herein for rerouting specific services from a signaling message routing node may be implemented using a computer program product comprising computer executable instructions embodied in a computer readable media. Exemplary computer readable media suitable for implementing the subject matter described herein include disk memory devices, application specific intergraded circuits, programmable logic devices, and downloadable electrical signals. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
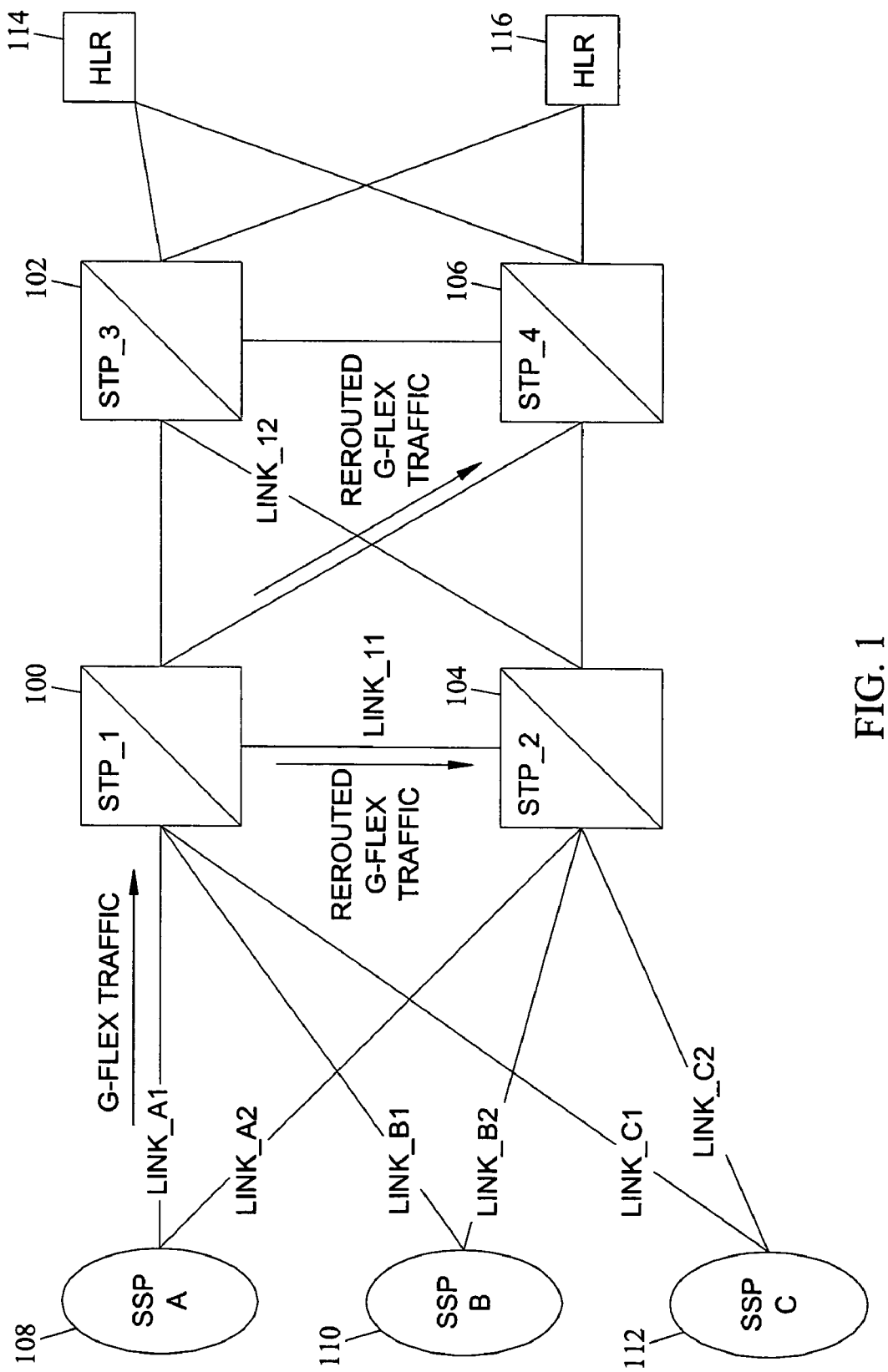
FIG. 1 is a block diagram illustrating an exemplary system for rerouting signal message traffic associated with specific services according to an embodiment of the subject matter described herein.

The subject matter described herein includes methods, systems, and computer program products for rerouting signaling message traffic associated with specific services in response to unavailability of one or more services. In one implementation, traffic may be rerouted by a signaling message routing node that receives signaling messages and that may provide some of the services or that may provide routing to another node associated with the service. Examples of services for which signaling message traffic may be rerouted include any of the above-described services and/or any other service that may be provided in a telecommunications signaling network. Referring to FIG. 1, signal transfer points 100, 102, 104, and 106 may include SS7 signal transfer functionality for routing signaling messages between nodes, such as SSPs 108, 110, and 112 and HLRs 114 and 116. Signal transfer points 100, 102, 104, and 106 may also include SS7 over IP signaling link functionality for sending and receiving SS7 signaling messages over IP signaling links and routing those messages to their intended destinations over both SS7 and IP signaling links. Signal transfer points 100, 102, 104, and 106 may also include functionality for routing session initiation protocol (SIP) messages between the nodes illustrated in FIG. 1 and between other nodes, such as IP multimedia subsystem (IMS) nodes.

In the illustrated example, it is assumed that STPs 100, 102, 104, and 106 include global title translation capabilities for translating the called party address and/or other parameters in the SCCP portion of a signaling message into a point code and subsystem number of an intermediate or final destination. For example, STP 100 may translate the called party address in a message received from SSP 108 to the point code and subsystem number of a destination node such as HLR 114. One particular type of GTT service that may be provided by STPs 100, 102, 104, and 106 is referred to as G-FLEX service, as described in the above-referenced '477 patent. Briefly, G-FLEX service includes translating the called party mobile identification number (MIN) from the mobile application part (MAP) portion of a received signaling message into a point code and a subsystem number of an HLR where a look-up is first performed in a database containing routing rules that are exceptions to routing rules contained in a range based GTT database. A look up in the exceptions database is used to locate the point code and subsystem number of the destination.

Each STP 100, 102, 104, and 106 may provide at least one service in addition to G-FLEX service. For example, each STP 100, 102, 104, and 106 may provide local number portability (LNP) translation service for received signaling messages. Accordingly, in response to unavailability of the G-FLEX or LNP service rather than disabling all services provided by STPs 100, 102, 104, and 106 in this example, each STP may route signaling message traffic associated with a service that is unavailable to another node for providing the service. For example, for the case of G-FLEX service, traffic originating from SSPs 108, 110, and 112 may be distributed between STPs 100 and 104 for example, SSP 108 may send half of its G-FLEX traffic on link A1 and the other half of its traffic on link A2. The remaining SSPs may perform similar load distributions.

When G-FLEX service becomes unavailable on STP 100, STP 100 may implement G-FLEX service rerouting. In implementing G-FLEX service rerouting, STP 100 may route all G-FLEX traffic received over link 11 to STP 104 or over link 12 to STP 106. The nodes originating the traffic will experience no service outage because the G-FLEX service will be provided by STPs 104 and 106. Once the G-FLEX database in STP 100 becomes available, G-FLEX rerouting can be deactivated. Activation or deactivation of G-FLEX rerouting can be automatic, for example, in response to a triggering event, such as availability of the G-FLEX database. In an alternate implementation, the G-FLEX database may be manually activated or deactivated by an operator.

In the example illustrated in FIG. 1, one advantage of receiving the traffic at the STP and rerouting the traffic for the unavailable service from the STP is that the rerouting of traffic is transparent to originating nodes. There is no need to inform the originating nodes of the unavailability of service at one of the STPs. One performance consideration is that in the example above, signaling links link 11 and link 12 need to have sufficient capacity to handle the increased service traffic. Another advantage of the system illustrated in FIG. 1 is that other services provided by STP 100, such as LNP service, may continue, even though G-FLEX service is unavailable.

Figure 2:
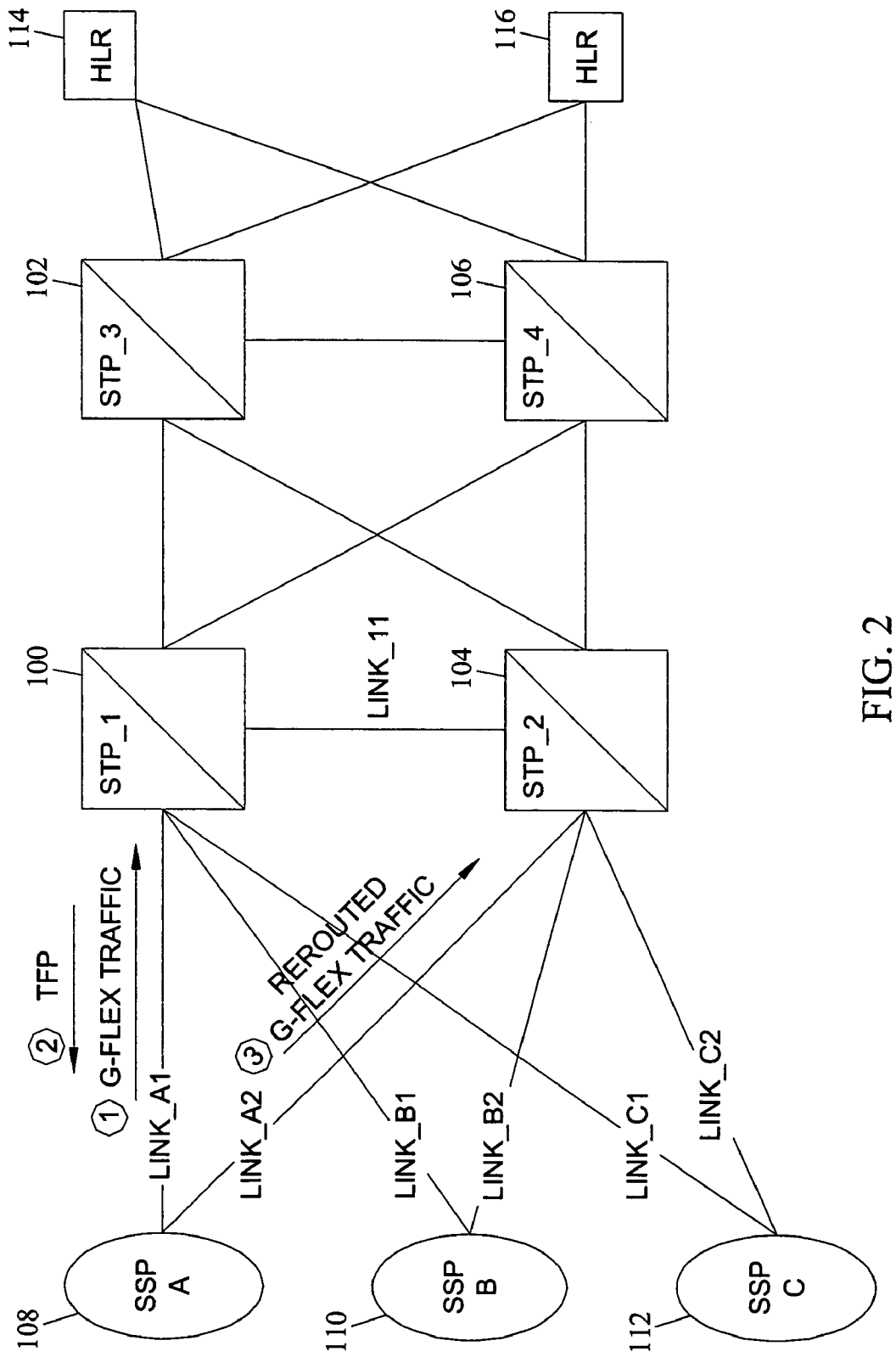
FIG. 2 is a block diagram illustrating an alternate system for rerouting signaling message traffic associated with specific services according to an embodiment of the subject matter described herein.

FIG. 2 is a block diagram of an alternate system for rerouting traffic associated with specific services in response to unavailability of one or more of the services. In FIG. 2, the nodes are the same of those illustrated in FIG. 1; hence, a description above will not be repeated herein. However, rather than rerouting specific traffic in response to unavailability of one or more services, each STP may be configured to identify specific service traffic, inform the originating nodes have the unavailability of the specific service, and provide the originating nodes with the opportunity to reroute the specific service traffic to an alternate STP. Each STP may continue to route traffic associated with services that are not disabled.

Using the same example above, each STP 100, 102, 104, and 106 may provide a plurality of services for signaling message traffic such as G-FLEX service and LNP translation service. Each STP may distinguish between GTT traffic and service traffic, i.e., traffic for which the STP provides a service in addition to or instead of GTT. For example, service traffic may be addressed to a specific point code, such as a service capability point code. GTT traffic may be addressed to the STP's capability point code. Once there is a service outage, originating nodes are informed of the outage, for example, using a response method transfer prohibited (TFP) message. The response method TFP message causes the originating nodes to stop sending service traffic to the node that sent the TFP message. All service traffic is sent to other service nodes. The originating node will initiate routeset test procedures. Once service is back on at the STP, a transfer allowed (TFA) message is sent to the traffic originating nodes in response to the routeset test message. The traffic originating nodes will not start sending traffic to this node. The activation or deactivation of rerouting can be performed manually by an operator. Alternatively, the activation or deactivation can be performed automatically by detecting when a service becomes unavailable or available.

In one example, it is assumed that nodes 108, 110, and 112 send G-FLEX traffic and GTT traffic to STPs 100 and 104. G-FLEX traffic will be addressed to the point code STP_S1 and STP_S2, identifying the G-FLEX service capabilities of STPs 100 and 104. Plain GTT traffic will be addressed to the point code STP1 and STP2 corresponding to the general capability point codes of STPs 100 and 104. In this example, it is assumed that SSP 108 sends half of its traffic on link A1 and the other half of its traffic on link A2. The remaining SSPs perform similar load distribution functions.

When G-FLEX service becomes unavailable on STP 100, STP 100 will send a response method TFP message regarding the point code STP_S1. This will cause SSP 108 to stop using link A1 for G-FLEX traffic. SSP 108 will now send all of its G-FLEX traffic on link A2. GTT traffic and MTP-routed traffic will not be impacted. That is, this traffic will be sent over link A1. Other STPs will do similar rerouting.

When G-FLEX service becomes available on STP 100, STP 100 will respond with a TFA message (when a routeset test message is received) regarding the point code STP_S1. The routeset test message will cause SSP A 108 to start distributing G-FLEX traffic between links A1 and A2. The remaining SSPs illustrated in FIG. 1 will do similar rerouting. Activation and deactivation of this feature can be automatic or in response to a triggering event, such as a signal from the G-FLEX subsystem indicating availability of its database.

One advantage of the service rerouting method illustrated in FIG. 2 is that an additional hop is not required for service traffic. One implementation detail is that this service rerouting method requires a mechanism for distinguishing between GTT traffic and service traffic. Such a mechanism may include examining an MTP parameter, such as the point code, examining SCCP parameters, such as translation type, nature of address indicator, numbering plan address, global title indicator, subsystem number, and/or TCAP parameters, such as operation code or MAP message type.

Figure 3:
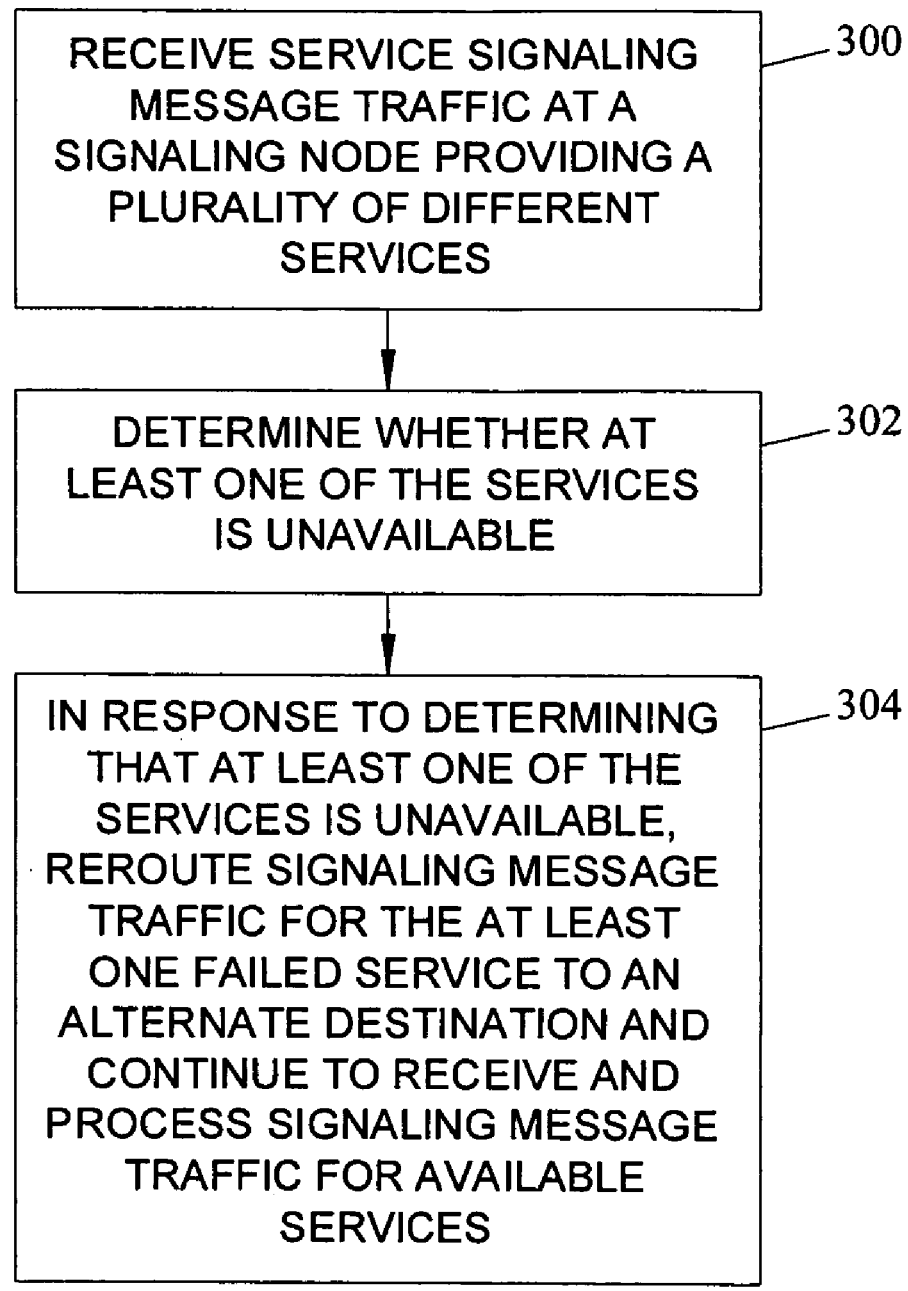
FIG. 3 is a flow chart illustrating an exemplary process for rerouting signaling message traffic according to an embodiment of the subject matter described herein.

FIG. 3 is a flow chart illustrating exemplary overall steps for routing specific service traffic from a signaling message routing node in response to unavailability of one of the services according to an embodiment of the subject matter described herein. Referring to FIG. 3, in step 300, signaling message traffic is received at a signaling message routing node that provides a plurality of different services. Examples of the services provided are described above. The signaling message may be an SS7 signaling message, such as a TCAP message carrying a MAP or other payload. In another example, the signaling message maybe an ISUP IAM message for which triggerless number portability service is being provided.

In step 302, it is determined whether at least one of the services is unavailable. This step may be performed using alarm generating functions associated with the specific services internal to the signaling message routing node that indicate when the services are unavailable. In step 304, in response to determining that at least one of the services is unavailable, signaling message traffic for the unavailable service is rerouted to an alternate destination. However, signaling message traffic for other services is received by the signaling message routing node and the processing of that traffic is continued.

As stated above, in one example, the signaling message routing node may perform the rerouting itself by forwarding the traffic to an alternate destination for processing. In an alternate example, the signaling message routing node may identify specific service traffic associated with an unavailable service and inform message originators of the unavailability of the specific service so that the originators can select an alternate destination for providing the service.

Figure 4:
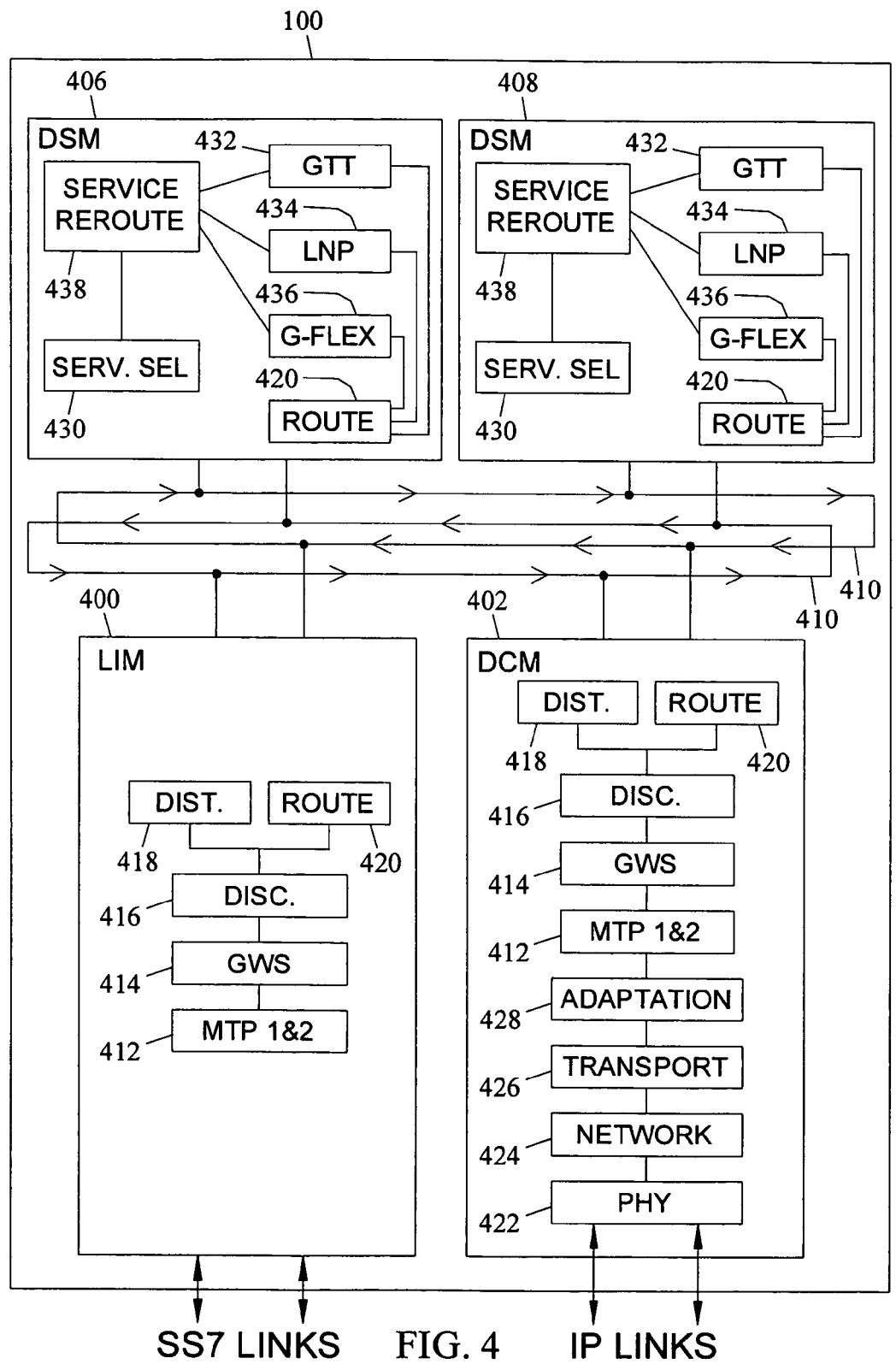
FIG. 4 is a block diagram illustrating an exemplary signaling message routing node for rerouting traffic associated with specific services in response to unavailability of one or more of the services according to an embodiment of the subject matter described herein.

FIG. 4 is a block diagram illustrating an exemplary internal architecture for a signaling message routing node for the routing of plurality of services and for rerouting signaling message traffic for one or more of the services in response to service unavailability. Referring to FIG. 4, signaling message routing node 100 may include a plurality of modules 402, 404, 406, and 408 connected to each other via a counter rotating, dual ring bus 410. Each module may include a printed circuit board with an application processor and a communications processor mounted thereon. The application processor performs signaling message routing and other functions described herein, such as those for rerouting traffic associated with specific services. The communications processor on each module may control communications with other modules over bus 410.

In the illustrated example, module 400 comprises a link interface module for interfacing with SS7 signaling links. Link interface module includes an MTP layer 1 and 2 function 412, a gateway screening function 414, a discrimination function 416, a distribution function 418, and a routing function 420. MTP layer 1 and 2 function 412 performs SS7 MTP layer 1 and 2 functions, such as error detection, error correction, and sequencing of SS7 signaling messages. Gateway screening function 414 screens incoming signaling messages based on parameters in the messages, such as OPC and DPC, to determine whether to allow the messages into a network. Discrimination function 416 determines whether received messages are addressed to the signaling message routing node for processing or whether the messages require routing. Discrimination function 416 forwards signaling messages that require further processing to distribution function 418, which distributes the messages to one or more modules, such as database service modules (DSMs) 406 and 408 for receiving specific services. It is these servcies for which the rerouting operations described herein may be implemented. Discrimination function 416 forwards messages that require routing to routing function 420. Routing function 420 may be an SS7 MTP layer 3 routing function that performs a lookup and a route table based on one or more parameters in a received message to determine the outband signaling link and associated card or module associated with that link. For example, routing function 420 may use the DPC, OPC, SI, and/or CIC or other parameters in a received signaling message to make a routing determination. Routing function 420 may forward signaling messages to the module associated with the outbound signaling link for routing.

Module 402 is a data communications module (DCM) for sending and receiving signaling messages over IP signaling links. Module 402 may send and receive IP-encapsulated SS7 messages and other types of IP telephony signaling messages, such as SIP signaling messages, over IP signaling links. In the illustrated example, module 402 includes a physical layer function 422, a network layer function 424, and a transport layer function 428. Module 402 may also include functions 412 through 420 described above with regard to LIM 400. Physical layer function 422 may perform OSI physical layer functions, such as sending and receiving messages over an underlying physical medium. In one implementation, physical layer function 422 may be implemented using the ethernet protocol. Network layer 424 performs OSI network layer functions, such as routing signaling messages based on network layer header information and possibly participating in network layer routing protocols. For received SS7 signaling messages, the routing functionality of network layer 424 may be bypassed such that the messages are routed based on their SS7 routing information, rather than IP routing information. For SIP messages, network layer function 424 may route messages based on IP addresses in the received signaling messages. Transport layer function 426 may perform OSI transport layer functions, such as administering connections with other nodes. In one example, transport layer function may be implemented using the stream control transmission protocol (SCTP). Alternate protocols that may be implemented by transport layer function 426 include transmission control protocol (TCP) and user datagram protocol (UDP). Adaptation layer function 428 may perform SS7 adaptation layer functions. Examples of protocols that may be implemented by adaptation layer function 428 include any of the SIGTRAN protocols, such as M2PA, M3UA, or SUA. The remaining functions of DCM 402 are the same as those described above with regard to LIM 400. Hence, a description thereof will not be repeated herein.

DSMs 406 and 408 provide database related services, including the triggerless services described above. In the illustrated example, each DSM includes a service selection function 430 for identifying a service to be provided for a received signaling message. Service selection function 430 may identify the service based on the parameters in the signaling message, such as the capability point code, or SCCP parameters, such as translation type, numbering plan, nature of addressing indicator, or even application layer parameters, such as TCAP operation code. Each DSM includes specific service modules for providing services for received signaling messages. In the illustrated example, these services include services provided by GTT service module 432, LNP service module 434, and G-FLEX service module 436. GTT module performs global title translation for received signaling messages. LNP service module 434 may perform LNP lookups for received signaling messages. G-FLEX service module 436 may perform exceptions based GTT lookups for messages that are destined for mobile communications network nodes, such as HLRs or SMSCs.

Service rerouting function 438 may perform the operations described herein for rerouting messages associated with specific services from STP 100. In one implementation, service reroute function may receive signaling messages addressed to an unavailable service and may reroute the signaling messages to an alternate destination. In another implementation, service reroute function 438 may perform the operation of informing the originating nodes of an unavailable service so that the originating nodes can perform the service rerouting.

In operation, when a signaling message is received by either LIM 400 or DCM 402, the signaling message is passed up the associated protocol stack. In this example, it is assumed that the signaling message is addressed to one of the services provided by DSMs 406 and 408. Accordingly, distribution function 418 may route the message to one of DSMs 406 and 408 for providing the specific service. Service selection function 430 on the associated DSM identifies the specific service and provides the message to service reroute function 438. If the service is available, service reroute function 438 may forward the message to the function that provides the identified service. If the service is not available, service reroute function 438, may reroute the signaling message to another node.

Assuming that the message is addressed to an unavailable service, service reroute function 438 may forward the message to the LIM or DCM associated with the outbound signaling link connected to the node that provides the specific service. If the service is available, the function that provides the service, such as GTT module 432, may perform the requested service. Routing function 420 may then route the message to the LIM or DCM associated with the outbound signaling link.

It will be understood that various details of the invention may be changed without departing from the scope of the invention. Furthermore, the foregoing description is for the purpose of illustration only, and not for the purpose of limitation.

What is claimed is:

1. A method for rerouting service signaling message traffic in response to a service unavailability, the method comprising:
   (a) receiving service signaling message traffic at a signaling message routing node providing a plurality of different services;
   (b) determining whether at least one of the services is unavailable; and
   (c) in response to determining that at least one of the services is unavailable, rerouting signaling message traffic for the at least one unavailable service to an alternate destination and continuing to receive and process signaling message traffic for at least one available service.

2. The method of claim 1 wherein rerouting signaling message traffic includes, at the signaling message routing node, detecting unavailability of the at least one service and rerouting the signaling message traffic destined for the unavailable service from the signaling message routing node to the alternate destination.

3. The method of claim 1 wherein receiving signaling message traffic includes receiving signaling message traffic addressed to individual service types and wherein rerouting the signaling message traffic includes informing originating nodes of the unavailability of the specific service type.

4. The method of claim 3 comprising identifying signaling messages addressed to specific service types.

5. The method of claim 4 wherein identifying signaling messages addressed to specific service types includes examining at least one parameter in each signaling message to identify the service type.

6. The method of claim 1 wherein the plurality of different services includes at least two of number portability translation service, mobile number portability service, triggerless number portability service, universal triggerless number portability service, global title translation service, triggerless mobile group dialing service, triggerless screening of call set up signaling messages, triggerless screening of wireless message service messages, and global title translation service.

7. The method of claim 1 wherein the plurality of different services includes a plurality of different services for global-title-routed messages.

8. The method of claim 1 wherein the at least one unavailable service comprises a triggerless service provide by the signaling message routing node of which a message originator is unaware and wherein rerouting the traffic includes transparently routing signaling message traffic received at the signaling message routing node that is identified for processing by the triggerless service to an alternate node for providing the triggerless service.

9. The method of claim 1 wherein the signaling message routing node comprises a signal transfer point.

10. The method of claim 1 wherein the signaling message routing node comprises a signal transfer point with SS7 over IP routing capabilities.

11. The method of claim 1 wherein the signaling message routing node comprises a SIP signaling message routing node.

12. The method of claim 1 comprising, detecting availability of the unavailable service, and discontinuing rerouting of the signaling message traffic in response to detecting the availability.

13. The method of claim 12 wherein discontinuing the rerouting includes automatically discontinuing the rerouting in response to detecting the availability.

14. The method of claim 12 wherein discontinuing the rerouting includes manually discontinuing the rerouting in response to availability of the specific service.

15. A method for rerouting global-title-routed signaling message traffic in response to a service unavailability, the method comprising:
 (a) receiving global-title-routed signaling message traffic at a signaling message routing node providing a plurality of different services;
 (b) determining whether at least one of the services is unavailable; and
 (c) in response to determining that at least one of the services is unavailable, rerouting signaling message traffic for the at least one unavailable service to an alternate destination and continuing to receive and process global-title-routed signaling message traffic for at least one available service.

16. A method for rerouting signaling message traffic in response to service unavailability, the method comprising:
 (a) receiving triggerless service signaling message traffic at a signaling message routing node providing at least one triggerless service;
 (b) determining whether the at least one triggerless service is unavailable; and
 (c) in response to determining that the at least one triggerless service is unavailable, at the signaling message routing node, identifying received signaling message traffic addressed to the at least one triggerless service and rerouting the identified signaling message traffic from the signaling message routing node to an alternate destination for providing the requested service.

17. A method for rerouting signaling message traffic in response to service unavailability, the method comprising:
 (a) receiving triggerless service signaling message traffic at a signaling message routing node providing at least one triggerless service;
 (b) determining whether the at least one triggerless service is unavailable; and
 (c) in response to determining that the at least triggerless service is unavailable, identifying received signaling message traffic addressed to the at least one triggerless service, and informing message originators of the unavailability of the at least one triggerless service.

18. A system for rerouting signaling message traffic in response to unavailability of a service, the system comprising:
 (a) a plurality of service modules for providing a plurality of different services for received signaling messages; and
 (b) a service rerouting module for determining whether at least one of the services is unavailable, in response to determining that at least one of the services is unavailable, for rerouting signaling message traffic for at least one unavailable service to an alternate destination and continuing to receive and process signaling message traffic for at least one available service.

19. The system of claim 15 wherein the service rerouting function is adapted to detect the unavailability of the at least one signaling message traffic at the signaling message routing node and to forwarding signaling message traffic for the unavailable service to an alternate destination.

20. The system of claim 18 wherein the service reroute function is adapted to, in response to detecting unavailability of at least one of the services, to inform originating nodes of the unavailability.

21. The system of claim 18 wherein the service reroute function is adapted to identify signaling messages addressed to specific service types.

22. The system of claim 21 wherein the service reroute function is adapted to identify signaling messages addressed to specific service types by examining at least one parameter in each signaling message to identify the service type.

23. The system of claim 18 wherein the plurality of different services includes at least two of number portability translation service, mobile number portability service, triggerless number portability service, universal triggerless number portability service, global title translation service, triggerless mobile group dialing service, triggerless screening of call set up signaling messages, triggerless screening of wireless message service messages, and global title translation service.

24. The system of claim 18 wherein the at least one unavailable service comprises a triggerless service provide by the signaling message routing node of which a message originator is unaware and wherein rerouting the traffic includes transparently routing signaling message traffic received at the signaling message routing node that is identified for processing by the triggerless service to an alternate node for providing the triggerless service.

25. The system of claim 18 wherein the plurality of different services includes a plurality of different services for global title routed messages.

26. The system of claim 15 wherein the signaling message routing node comprises a signal transfer point.

27. The system of claim 18 wherein the signaling message routing node comprises a signal transfer point with SS7 over IP routing capabilities.

28. The system of claim 18 wherein the signaling message routing node comprises a SIP signaling message routing node.

29. The system of claim 18 wherein the service reroute function is adapted to, in response to detecting availability of the unavailable service, and discontinuing rerouting of the signaling message traffic in response to detecting the availability.

30. The system of claim 29 wherein the service reroute function is adapted to automatically discontinue the rerouting in response to detecting the availability.

31. The system of claim 29 wherein the service reroute function is manually configurable to discontinue the rerouting.

32. A computer program product comprising computer-executable instructions embodied in a computer-readable for performing steps comprising:
 (a) receiving service signaling message traffic at a signaling message routing node providing a plurality of different services;
 (b) determining whether at least one of the services is unavailable; and
 (c) in response to determining that at least one of the services is unavailable, rerouting signaling message traffic for the at least one unavailable service to an alternate destination and continuing to receive and process signaling message traffic for at least one available service.

* * * * *